June 23, 1970 D. H. CARPENTER 3,517,114

COLOR KILLER AND AUTOMATIC CHROMA CONTROL CIRCUITS

Filed March 6, 1967 2 Sheets-Sheet 1

INVENTOR
DAVID H. CARPENTER

BY Donald V. Timbie
ATTORNEY

INVENTOR
DAVID H. CARPENTER

United States Patent Office 3,517,114
Patented June 23, 1970

3,517,114
COLOR KILLER AND AUTOMATIC CHROMA CONTROL CIRCUITS

David H. Carpenter, Indianapolis, Ind., assignor to RCA Corporation, a corporation of Delaware
Filed Mar. 6, 1967, Ser. No. 620,728
Int. Cl. H04n 9/48
U.S. Cl. 178—5.4 5 Claims

ABSTRACT OF THE DISCLOSURE

A chrominance amplifier receives an automatic gain control voltage and a color killer voltage at a common input terminal.

Figure 1:
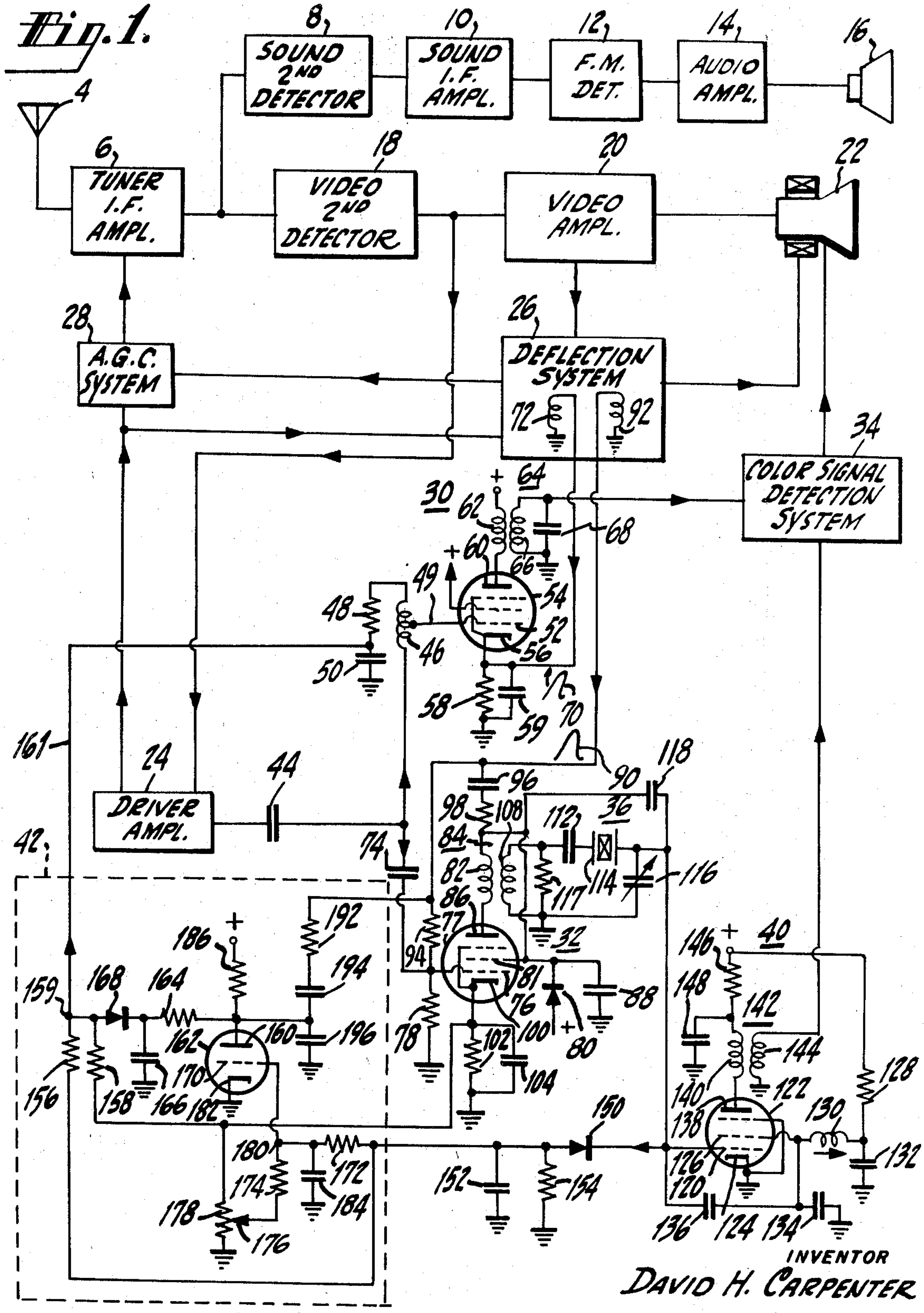

To avoid interaction between the color killer circuit, which functions to render the chrominance amplifier inoperative for the absence of burst, and the automatic chroma control circuit (A.C.C.), which functions to control the gain of the chrominance amplifier as a function of burst magnitude; a unidirectional current conduction device is biased so that a threshold between A.C.C. operation and killer operation is provided.

This invention relates to improved circuits for providing automatic chroma control, color killing and burst blanking in the chrominance channel of a color television receiver.

Color television receivers often include automatic chroma control circuits for maintaining the chroma signals at a proper level, burst blanking circuits for preventing the periodic color synchronizing bursts from interfering with the operation of the color signal detection circuits, and color killer circuits for cutting off the chroma channel when monochrome transmissions are being received or when the received color transmission is so weak that a better picture is produced without color than with it.

It is an object of the invention to provide improved circuits for performing these functions especially in color television receivers having but a single chrominance amplifier to which the necessary control voltages may be applied.

It is another object of the invention to provide an improved color killer circuit that operates without the need for additional amplifiers to change the chroma channel from a maximum gain condition to cut off in response to a small decrease below a preselected level in the amplitude of the color synchronizing bursts applied to the chroma channel.

A further object of the invention is to provide an improved color killer circuit that operates in such a manner as to permit the chroma amplifier to which the color killer control voltage is applied to be cut off during the intervals when the bursts are present.

The objects may be attained in accordance with this invention in the following manner. An output electrode of a color killer amplifier is connected via a resistor to a point of D.C. operating potential of a given polarity. The amplifier is also coupled so as to rectify periodic pulses in such manner as to produce a D.C. voltage of the opposite polarity at the output electrode. A unilateral current conducting device is coupled between the output electrode of the color killer amplifier and a gain control electrode of the chrominance amplifier to which an A.C.C. potential is applied. Means are provided for increasing the conduction in the color killer amplifier as the amplitude of the color synchronizing bursts decreases. If desired, burst blanking pulses may be applied to a control electrode of the chrominance amplifier to which the A.C.C. voltage is applied.

Figure 2:
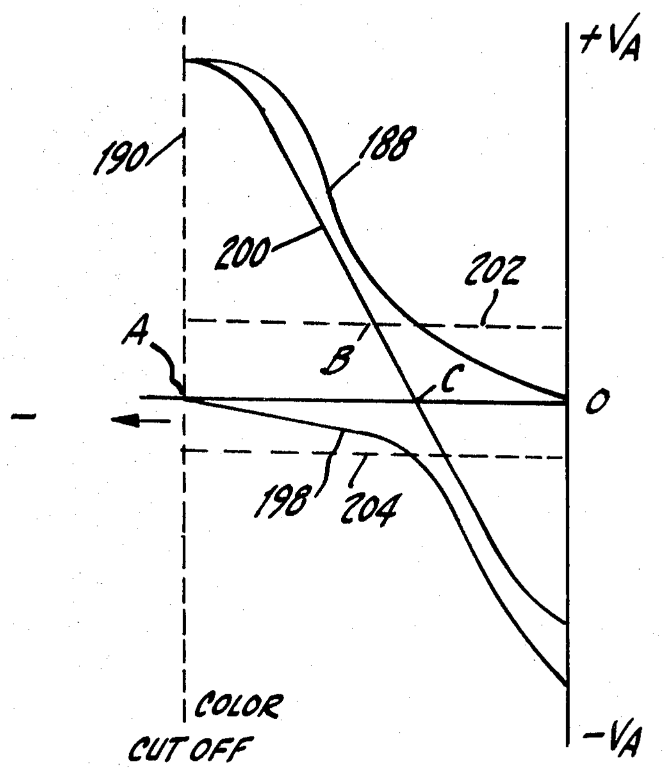

The features of the present invention which are presently believed to be novel are set forth with particularity in the appended claims. The invention, both as to its organization and manner of operation, may best be understood by reference to the following description, taken in connection with the accompanying drawings, in which:

FIG. 1 illustrates in block diagram and schematic form a color television receiver incorporating the circuits involving this invention; and FIG. 2 includes curves illustrating certain operating characteristics of the color killer amplifier.

Reference is now made to FIG. 1 for a description of one possible arrangement of the major components of a color television receiver. Transmitted signals are intercepted by an antenna 4 and applied to means 6 for selecting a given channel and producing corresponding I.F. signals.

The sound channel includes a second detector 8, an amplifier 10 that is selectively responsive to the beat frequency between the frequency modulated sound I.F. carrier and the amplitude modulated video I.F. carrier. Detector 12 recovers the audio signal represented by the beat frequency, and after suitable amplification in an audio amplifier 14, the audio signal is applied so as to energize a loudspeaker 16.

The means for processing luminance signals is a luminance channel having a second detector 18 and a video amplifier 20, the output of the latter being applied so as to control the luminance of the images formed by the cathode ray tube 22.

Synchronization of the line and field deflection is obtained by connection of a driver amplifier 24 between the output of the video second detector 18 and a deflection system 26.

An automatic gain control voltage for the I.F. and/or R.F. amplifiers included in the means 6 is derived by an A.G.C. system 28 that is keyed by pulses derived from the deflection system 26 so as to be responsive only to the line synchronizing pulses contained within the video signals supplied to it from a source of video signals herein shown as the driver amplifier 24.

In the chrominance channel of the receiver, which is the means for processing chrominance signals, the output of the driver amplifier 24 is applied to the input of a chrominance amplifier 30 and also to the input of a burst separating means herein illustrated as a keyed amplifier 32. The output of the chrominance amplifier 30 is coupled to a color signal detection system 34, and the output of the burst amplifier 32 is coupled via a filter network 36 to a control electrode of a color reference oscillator 40 so as to synchronize its phase and frequency. The output of the oscillator 40 is applied to the color signal detection system 34. The outputs of detection system 34 are applied to the cathode ray tube 22 so as to control the color in the picture produced thereby. The A.C.C. and color killer circuits of this invention are included within the dotted line 42.

In particular, the video signals at an output of the driver amplifier 24 are coupled by a capacitor 44 to a series resonant circuit, which is comprised of an inductor 46, a Q spoiling resistor 48 and a capacitor 50. The series circuit selects the chrominance signals from the rest of the video signals and applies them via a connection 49 to a gain control grid 52 of a pentode chrominance amplifier 54. The cathode 56 is biased by a cathode resistor 58 and a parallel bypass capacitor 59. The anode 60 is connected via a primary winding 62, tuned by inherent capacitance, not shown, of an output transformer 64, to a point of positive D.C. potential, and the amplified chrominance signals produced in the primary winding 62 are coupled to the color signal detection system 34 by a secondary winding 66 that is tuned to resonance for the frequencies of the chrominance signals by a shunt capacitor 68. The primary and secondary windings 62 and 66 constitute a bandpass transformer for the chrominance signals. Positive burst blanking pulses 70 that occur during the intervals when the color synchronizing burst are present, may be derived by an auxiliary winding 72 on the line deflection transformer, not shown, in the deflection system 26 and applied to the cathode 56 so as to reduce or cut off conduction in the pentode 54 and prevent the color synchronizing bursts from being applied to the color signal detection system 34.

The burst amplifier 32, filter 36 and oscillator 40 operate to provide a continuous reference wave to the color detection system 34 that is synchronized in phase and frequency with the several cycles of the color subcarrier that are contained within the bursts. Video signals, including the bursts, are coupled from the driver amplifier 24 via the capacitor 44 and a capacitor 74 to a control grid 76 of a pentode amplifier 77 and to the ungrounded terminal of a grid leak resistor 78. Positive operating potential is supplied via a diode 80 to the screen grid 81, and via a primary winding 82 of an output transformer 84 to the anode 86. Chrominance signal frequencies are bypassed to ground by a capacitor 88. In order that the amplifier 77 may pass only the color synchronizing bursts, positive keying pulses 90, which are derived from an auxiliary winding 92 on the line deflection transformer, not shown, in the deflection system 26 are applied with reduced amplitude via a voltage divider, formed by a resistor 94 and the grid leak resistor 78, to the control grid 76. Increased gain may be obtained by also applying the keying pulses 90 to the screen grid 81 via a capacitor 96 and a resistor 98 and to the anode 86 via the primary winding 82. During the intervals between the keying pulses 90, the grid 76 is at ground potential, and the cathode 100 is maintained at a sufficiently positive potential to cut off the amplifier 77 by selecting a sufficiently large value for the cathode resistor 102 and suitably long RC time constant for the cathode resistor 102 and the shunt capacitor 104.

The amplified bursts appearing across the primary winding 82 of the output transformer 84 are coupled by a secondary winding 108 to a series circuit comprised of a D.C. blocking capacitor 112, a crystal 114 and a variable capacitor 116. The series circuit is resonant only at the fundamental frequency of the bursts so that a continuous wave of the fundamental frequency, which is the same as the frequency of the cycles of color subcarrier included in the burst, appears across the variable capacitor 116. The ratio of the turns of the primary winding 82 and the secondary winding 108 are such as to match the impedance at the anode 86 to the impedance of the series circuit 112, 114, 116. A resistor 117 having a resistance equal to the magnitude of the series circuit impedance is connected in shunt with the secondary winding 108. Neutralization of sideband components of the bursts that might pass through the capacitance of the holders 117 of the crystal 114 is effected by a capacitor 118.

The continuous wave of the color subcarrier frequency thus produced across the capactior 116 is applied to a control grid 120 of an amplifier 122 of the oscillator 40 so as to pull the oscillator 40 into phase and frequency synchronism. In the particular oscillator circuit shown, the cathode 124, the control grid 120, and the screen grid 126 are connected in a circuit configuration similar to that of a tuned plate tuned grid oscillator. Positive D.C. operating potential is applied to the screen grid 126 via a resistor 128, and an inductor 130. A capacitor 132 provides a low impedance path for the frequency of the reference wave between ground and the junction of the inductance 130 and the resistor 128, and thus the inductor 130 is effectively in parallel with a capacitor 134. Their values are selected so as to produce parallel resonance at a frequency just a little above the frequency of the reference wave. The crystal 114 and the variable capacitor 116 comprise the significant elements of a parallel circuit connected between the grid 120 and ground that is resonant at the frequency of the reference wave. A capacitor 136 is connected between the screen grid 126 and the control grid 120 so as to provide more feedback than is produced by the interelectrode capacitance between them. The anode 138 of the amplifier 122 is electron coupled to the screen grid 126 and is connected to a point of positive voltage via a primary winding 140 of an output transformer 142 that is in series wth a voltage dropping resistor 146. A bypass capacitor 148 is connected between ground and the junction of the primary winding 140 and the resistor 146. The reference wave output of the oscillator produced across the primary winding 140 is coupled via a secondary winding 144 to the color signal detection system 34.

The following description relates to a source of or a means for deriving a voltage that varies in magnitude with the amplitude of the bursts and hence with the level of the chrominance signals. When no bursts are present in the video signal, no continuous wave is applied to the grid 120, and the oscillator 40 operates at a frequency that is approximately equal to that of the color subcarrier. Positive half cycles of the oscillations produced at the control grid 120 by oscillator action are rectified by the grid 120 and cathode 124 so as to produce at the grid 120 a negative voltage of a given value. When bursts are present in the video signal, and the oscillator 40 is synchronized, the continuous wave from the capacitor 116 adds in phase to the oscillations produced at the control grid 120 by the oscillator so that the rectified D.C. voltage produced at the grid increases. Since the change in the D.C. voltage at the grid 120 is proportional to the amplitude of the bursts and hence, during normal operation, to the amplitude of the chrominance signals at the output of the driver amplifier 24, it can be used for A.C.C. purposes.

A D.C. voltage equal to that produced at the grid 120 can be produced by rectifying the negative half cycles of the oscillations at the grid 120. This is done by connecting a diode 150, a parallel capacitor 152 and resistor 154 in series between the grid 120 and ground. The voltage at the ungrounded side of the capacitor 152 produced by the rectifying action of the diode 150 adds in like polarity to that produced at the grid 120 by the rectifying action of the grid 120 and cathode 124 so that the voltage available across the capacitor 152 for A.C.C. purposes and for control of the color killer circuit is nearly doubled.

Reference is now made to the portion of the A.C.C. circuit of FIG. 1 which is contained within the dotted line 42. The purpose of the A.C.C. circuit is to control the gain of the chrominance amplifier 30 in such manner to remove the undesired variations in the amplitude of the chrominance signal. As the level of the signals from the driver amplifier 24 decreases, the A.C.C. circuit operates to increase the gain of the chrominance amplifier 30. Direct application of the voltage across the capacitor 152 to the grid 52 of the chrominance amplifier 54 would cause it to operate at a lower gain, even when the bursts are not present, because the rectification of the oscillations produced by the oscillator 40 makes the voltage too negative. Accordingly, means are provided for applying the voltage to the control grid 52 so that the voltage variation across the capacitor 152 is translated to a more positive range by applying it to one terminal of a voltage divider comprised of series resistors 156 and 158 and by connecting the other terminal of the voltage divider 156, 158 to a point of positive potential, in this case the cathode 100 of the burst gate amplifier 77. The voltage at the junction 159, between the resistors 156, 158, which has been translated in this manner, is the A.C.C. voltage, and it is applied to the grid 52 of the chrominance amplifier 54 via lead 161, the Q spoiling resistor 48 and a portion of the inductor 46. As the amplitude of the bursts increases, the A.C.C. voltage applied to the grid 52 becomes more negative, thus reducing the gain of the chrominance amplifier 54 as desired.

The color killer circuit of this invention will now be described. In order to cut off the chrominance amplifier 54 when the amplitude of the color synchronizing bursts falls below a selected level, means responsive to the amplitude of the bursts are provided for developing a negative color killer voltage at the anode or output electrode 160 of a color killer amplifier 162. It is applied via a smoothing filter, comprised of a series resistor 164 and shunt capacitor 166, and unilateral current conducting device, herein shown as a diode 168, to the lead 161 and thence to the grid 52 of the chrominance amplifier 54 via the Q spoiling resistor 48 and a portion of the inductor 46. The color killer voltage at the anode 160 is developed by providing means for controlling the conductivity of the color killer amplifier 162 with the voltage across the capacitor 152. Because the voltage across the capacitor 152 may be so negative under all conditions as to cut off the color killer amplifier 162, the voltage is translated in a positive direction. This is effected by connecting resistors 172 and 174 in series between the capacitor 152 and a tap 176 of a potentiometer 178. One terminal of the potentiometer 178 is at ground and the other is connected to a point of positive potential such as the cathode 100 of the burst gate amplifier 77. The control grid 170 of the color killer amplifier 162 is connected to the junction 180 between the resistors 172, 174, and the cathode control electrode 182 is connected to ground. Reduction of the ripple in the voltage applied to the grid 170 is brought about by connection of a capacitor 184 between the grid 170 and ground. Varying the position of the tap 176 permits the color killer amplifier 162 to conduct at a desired voltage, and hence at a desired amplitude of the bursts.

Development of a color killer voltage at the anode 160 of the color killer amplifier 162 that changes in a negative direction as the amplitude of the bursts decreases is accomplished by two actions. First, the anode 160 is connected to a point of positive potential by a large resistor 186. As the voltage applied to the grid 170 becomes less negative, due to a decrease in the amplitude of the burst, a point is reached, depending on the setting of the tap 176, when the color killer amplifier 162 begins to conduct. Curve 188 of FIG. 2 illustrates the gradual reduction in the positive voltage of the anode 160 produced by increased current through the resistor 186 as the voltage at the grid 170 decreases to zero from a cut off value indicated by the vertical dotted line 190. This action by and of itself cannot cause the anode 160 to become negative with respect to ground.

The second action involves the rectification of positive pulses supplied between the anode 160 and the cathode 170. In this particular circuit, the pulses are derived from the keying pulses 90 by a series circuit to ground comprised of an integrating resistor 192 and voltage dividing capacitors 194 and 196, the anode 160 being connected to the junction of the capacitors. The purpose of this series circuit, or coupling means, is to reduce the amplitude of the keying pulses and attenuate some of the high frequency components so as to lessen coupling between the anode 160 and electrodes of the oscillator amplifier 122 when they are contained within a single evacuated envelope. The peak amplitude of the pulses applied to the anode 160 must exceed the positive potential applied to the resistor 186. When the grid 170 is sufficiently negative to cut off the color killer amplifier 162, no rectification takes place. However, as the grid 170 becomes less negative, the efficiency of the rectification increases so as to produce an increasingly negative potential at the anode 160 as indicated by the curve 198 of FIG. 2.

The combined effect of the two actions on the color killer potential at the anode 160 is represented by the curve 200. Whenever, the anode 160 becomes negative with respect to the control grid 52 of the chrominance amplifier 54, the diode 168 conducts and the voltage at the anode 160 is applied to the control grid 52. The tap 176 is generally set so that the color killer amplifier 162 does not start to conduct until the voltage applied to the grid 52 of the chrominance amplifier 54 from the junction 159 is such that the latter is operating at maximum gain. Under this condition, the voltage at the junction 159 is slightly positive, as indicated by the horizontal dotted line 202. Therefore, as soon as the color killer voltage, curve 200, at the anode 160 drops below the line 202, the diode 168 conducts and the color killer voltage is applied to the control grid 52. Further drop in the color killer voltage actually reduces the gain of the chrominance amplifier 54 until the voltage reaches a negative value, such as indicated by the horizontal dotted line 204, that is sufficient to cut off the chrominance amplifier 54. Thus, the change in voltage at the grid 170 of the color killer amplifier 162 necessary to change the chrominance amplifier 54 from a condition of maximum gain to cut off is equal to the difference between the grid voltage at point B, where the curve 200 crosses the dotted line 202, and the voltage at the point C, where the curve 200 crosses the dotted line 204. On the other hand, the rectification action alone, as indicated by the curve 198, would require a much larger change in voltage at the grid 170 from the point A to the point C in order to change the chrominance amplifier 54 from a condition of maximum gain to cut off.

Furthermore, the action of the resistor 186 prevents the color killer voltage at the anode 160 from being applied to the grid 52 of the chrominance amplifier 34 until the voltage produced by the rectification action is changing more rapidly as indicated by the increased slope of the curve 204 between the points B and C. Application of a color killer voltage that does not cut off the chrominance amplifier 54 is undesirable as it causes the amplifier to operate at reduced gain thus increasing the noise in the picture. This noisy condition is more likely to occur when the rectifying action alone is used than when it is combined with the action of the anode resistor 186 because there is a much larger chance of a signal being received having burst amplitudes that produce voltages at the color killer grid 170 that lie between the points A and C than between the points B and C.

It will be noted that the chrominance amplifier 54 can be cut off by the burst blanking pulses 70 without having any effect on the operation of the color killer circuit, as the latter develops the color killer voltage independently.

FIG. 1 illustrates an application of the invention to a particular receiver designed to operate in response to the type of color transmission presently approved for use by the Federal Communications Commission of the U.S.A. However, it can be used in other receivers designed for use in this system as well as in receivers designed for use in other color transmission systems. In the receiver illustrated in FIG. 1, the control voltage developed across the capacitor 152 is derived indirectly from the color synchronizing bursts, but it could have been derived directly from them by rectification.

Furthermore, the invention has been described in a circuit using vacuum tubes, and it is apparent that the particular voltage values and polarities might be different if transistors were utilized. In other television systems bursts may be included for other purposes or no burst may be present, but in either case, means can be provided to derive a control signal that varies in a given direction as the level of the color signal goes to zero, as in the case of a monochrome transmission, or decays to a level where it is advisable to disable the color channel that supplies signals to the picture producing device.

The following table indicates the values of certain parameters and voltages which have been found to yield satisfactory performance.

Tube 54—Pentode section of a GH8A.
Tube 77—Pentode section of a 5GH8A.
Tube 162—Triode section of a 5GH8A.
Tube122—Pentode section of a 5GH8A.
Diode 150—1N60.
Diode 168—FD333.
Resistor 154—82K ohms.
Resistor 172—2.7M ohms.
Resistor 174—10.0M ohms.
Resistor 178—1.0M ohms.
Resistor 156—2.2M ohms.
Resistor 158—12.0M ohms.
Resistor 164—150K ohms.
Resistor 186—3.9M ohms.
Resistor 48—82 ohms.
Resistor 192—47K ohms.
Capacitor 152—10 pf.
Capacitor 184—.01 μf.
Capacitor 166—.01 μf.
Capacitor 194—.01 μf.
Capacitor 196—390 pf.
V at cathode 100—65 v.
V at tip of Resistor 186——140 v.
V across Capacitor 152 with no burst present——10 v.
Peak to peak voltage of Pulse 90—250 v.

It is contemplated that the circuit of this invention may be used in other types of receivers which are adapted to produce control voltage that varies in relation to the level of the chrominance signals in other ways or wherein the bursts, although being in the frequency range of the chrominance signals, are used in a different manner.

What is claimed is:

1. In a color television receiver wherein the detected video signal includes periodic color synchronizing bursts, the combination of:
- a chrominance amplifier having a gain control electrode,
- detector means for developing a first control voltage that varies in amplitude with changes in amplitude of the color synchronizing bursts,
- means for applying said first control voltage to said gain control electrode of said chrominance amplifier for increasing the gain thereof for smaller bursts amplitudes and for decreasing the gain thereof for larger bursts amplitudes,
- a color killer amplifier having an input electrode and an output electrode,
- a source of periodic pulses,
- means coupling said output electrode to said source of pulses so as to tend to produce at said output electrode, a second control voltage of an amplitude dependent on a voltage appearing at said input electrode,
- means coupling the input electrode of said color killer amplifier to said detector means for causing said amplifier to develop at the output electrode, said second control voltage having amplitude variations opposite to those of said first control voltage, and
- means coupled between said output electrode of said color killer amplifier and said gain control electrode of said chrominance amplifier, for providing isolation of said second control voltage from said gain control electrode for a first given range of burst amplitudes, and for applying said second control voltage to said control electrode to effectively disable said chrominance amplifier for amplitudes of burst below said given range.

2. In a color television receiver having means for processing luminance signals and means for processing color signals, a color killer circuit for disabling said means for processing color signals when the level of said color signals falls below a given value comprising in combination:
- a color killer amplifier having first and second control electrodes and an output electrode,
- means establishing said first control electrode at a reference potential,
- a resistor connected between said output electrode and a point of potential of such polarity as to tend to increase the flow of current between said first control electrode and said output electrode and through said resistor,
- a source of pulses having two output terminals across which said pulses appear,
- means including a capacitor for coupling said output electrode of said color killer amplifier to one of the terminals of said source, and means connecting said first control electrode to the other terminal of said source, whereby said pulses are rectified so as to tend to produce a voltage at said output electrode that has a polarity opposite to the polarity of said point of potential,
- means for disabling said means for processing said color signals including,
- a unilateral current conducting device having two terminals, one of said terminals being connected to said output electrode of said color killer amplifier, the polarity of said device being such that it conducts when the voltage produced by the rectification of said pulses reaches a predetermined value,
- means for producing a control voltage that changes as the level of color signals changes, and
- means for coupling said control voltage between said first and second control electrodes of said color killer amplifier with such polarity that current conduction between said first control electrode and said output electrode of said color killer amplifier increases as said control signal decreases.

3. In a color television receiver, the combination of:
- a chrominance amplifier having a gain control electrode,
- a source of voltage that varies in magnitude with undesired variations in the level of the chrominance signals,
- means for applying a voltage derived from said source to said gain control electrode for increasing the gain of said chrominance amplifier for said undesired variations as tending to decrease said level and for decreasing the gain for said undesired variations as tending to increase said level,
- an impedance having first and second terminals, said first terminal being connected to a point of potential having a given polarity with respect to a reference potential,
- means for developing at said second terminal of said impedance a color killer voltage under the control of said voltage derived from said source, the color killer voltage having such polarity as to increase the voltage across said impedance, which voltage polarity is in a direction to decrease said gain of said chrominance amplifier for decreasing variations in the level of said chrominance signals, and
- a unilateral current conducting device connected between said second terminal of said impedance and said gain control electrode of said chrominance amplifier, the polarity of said device being such that it tends to conduct when said color killer voltage reaches a predetermined level representative of a predetermined lowest level of chrominance signals for inactivating said chrominance amplifier.

4. In a color television receiver that controls the color content of the picture in response to chrominance signals and periodic bursts of color subcarrier contained in the video signal, the combination of an A.C.C. circuit and color killer circuit comprising,
- a chrominance signal amplifier having a gain control electrode that reduces the gain of said amplifier as the voltage applied to it changes toward a given polarity, an impedance having first and second terminals, said first terminal being connected to a point of direct current potential having a polarity opposite to said given polarity, a unilateral current conducting device connected between said gain control electrode and said second terminal with such polarity that it conducts when the voltage at said second terminal with respect to the voltage at said gain control electrode has said given polarity, and means for applying a voltage to said gain control electrode of said chrominance amplifier that changes in a direction opposite to said given polarity as the level of the chrominance signals decreases and for producing at said second terminal of said impedance a color killer voltage that changes toward said given polarity as the level of said chrominance signal decreases, whereby said color killer voltage causes said unilateral current conducting device to conduct when said chrominance signals fall below a given level, thereby applying said color killer voltage to said gain control electrode of said chrominance amplifier so as to reduce its gain.

5. In a color television receiver responsive to video signals having bursts and chrominance signals, the combination comprising, a source of video signals, a chrominance amplifier coupled to said source, said chrominance amplifier having a plurality of electrodes including a gain control electrode, which reduces the gain of the amplifier as the voltage applied to it changes toward a given polarity, burst separating means coupled to said source, means for deriving from said bursts an A.C.C. voltage that has variations in magnitude related to the variations in amplitude of the bursts and for applying said voltage to said gain control electrode, an impedance having first and second terminals, said first terminal being connected to a point of potential having a polarity opposite to said given polarity, a unilateral current device connected between said gain control electrode and said second terminal with such polarity that it conducts when the voltage at said second terminal with respect to the voltage at said gain control electrode has said given polarity, means responsive to the amplitude of the bursts for producing at said second terminal of said impedance a color killer voltage that changes toward said given polarity as the amplitude of the bursts decreases, said means providing a color killer voltage of an amplitude to cause said unilateral conducting device to conduct for disabling said amplifier when said burst amplitude decreases to a predetermined value.

References Cited

UNITED STATES PATENTS 2,813,147 11/1957 Richman ____________ 178—5.4

2,921,122 1/1960 Macovski ___________ 178—5.4

ROBERT L. GRIFFIN, Primary Examiner

R. P. LANGE, Assistant Examiner